United States Patent
Newstadt et al.

(10) Patent No.: US 10,402,549 B1
(45) Date of Patent: Sep. 3, 2019

(54) SYSTEMS AND METHODS FOR CREATING VALIDATED IDENTITIES FOR DEPENDENT USERS

(71) Applicant: Symantec Corporation, Mountain View, CA (US)

(72) Inventors: Keith Newstadt, West Newton, MA (US); Brian Chong, Castro Valley, CA (US)

(73) Assignee: Symantec Corporation, Mountain View, CA (US)

( * ) Notice: Subject to any disclaimer, the term of this patent is extended or adjusted under 35 U.S.C. 154(b) by 192 days.

(21) Appl. No.: 14/972,876

(22) Filed: Dec. 17, 2015

(51) Int. Cl.
  *G06F 21/62* (2013.01)
  *G06F 21/45* (2013.01)
  *G06F 21/31* (2013.01)

(52) U.S. Cl.
  CPC ............ *G06F 21/31* (2013.01); *G06F 21/45* (2013.01)

(58) Field of Classification Search
  None
  See application file for complete search history.

(56) References Cited

U.S. PATENT DOCUMENTS

| | | | | |
|---|---|---|---|---|
| 7,441,008 B2* | 10/2008 | Johnson | ............... | G06F 9/466 709/213 |
| 8,327,428 B2* | 12/2012 | Bailey | ................. | G06F 21/41 709/217 |
| 9,003,193 B2* | 4/2015 | Wu | ................. | H04L 63/0428 713/171 |
| 2005/0065799 A1* | 3/2005 | Dare | ................. | G06F 21/6245 705/50 |
| 2005/0081065 A1* | 4/2005 | Brickell | ............... | G06F 21/57 726/19 |
| 2005/0144452 A1* | 6/2005 | Lynch | ............... | G06F 21/33 713/170 |
| 2006/0004662 A1* | 1/2006 | Nadalin | ................. | H04L 63/02 705/50 |
| 2006/0059344 A1* | 3/2006 | Mononen | ............. | H04L 63/061 713/171 |
| 2007/0005961 A1* | 1/2007 | Hamblin | ................. | G06F 21/62 713/167 |

(Continued)

FOREIGN PATENT DOCUMENTS

CA        2862334 A1 *  7/2013  ............ G06F 21/30

*Primary Examiner* — Venkat Perungavoor
(74) *Attorney, Agent, or Firm* — FisherBroyles, LLP

(57) ABSTRACT

The disclosed computer-implemented method for creating validated identities for dependent users may include (1) identifying both a validated user of an identity validation service who has a previously validated identity and a dependent user who cannot create a new validated identity via the identity validation service, (2) enabling, via a graphical user interface displayed on the computing device, the validated user to create the new validated identity for the dependent user in response to determining that the validated user has the previously validated identity, (3) linking the new validated identity for the dependent user to the previously validated identity of the validated user, and (4) generating a token that represents the new validated identity for the dependent user and that comprises a link to the previously validated identity of the validated user. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2009/0064303 | A1* | 3/2009 | Dickinson | G06Q 10/06 |
| | | | | 726/10 |
| 2009/0182816 | A1* | 7/2009 | Yu | G06F 9/541 |
| | | | | 709/206 |
| 2011/0225643 | A1* | 9/2011 | Faynberg | G06F 21/31 |
| | | | | 726/10 |
| 2012/0144459 | A1* | 6/2012 | Nguyen | H04L 9/0891 |
| | | | | 726/5 |
| 2013/0290725 | A1* | 10/2013 | Hogan | H04L 9/3268 |
| | | | | 713/176 |
| 2014/0283054 | A1* | 9/2014 | Janjua | H04L 63/1408 |
| | | | | 726/23 |
| 2015/0026786 | A1* | 1/2015 | Alexander | H04L 63/1408 |
| | | | | 726/7 |
| 2015/0278500 | A1* | 10/2015 | Burch | G06F 21/335 |
| | | | | 726/6 |
| 2015/0358165 | A1* | 12/2015 | Ollikainen | G06F 17/3097 |
| | | | | 726/9 |

\* cited by examiner

SYSTEMS AND METHODS FOR CREATING VALIDATED IDENTITIES FOR DEPENDENT USERS

BACKGROUND

In the Internet age, it is important to have a means of securely identifying someone that doesn't rely on the physical presence of the person or their identifying documents. While many applications and services benefit from requiring users to have validated identities, completing an identity validation process repeatedly is tedious and frustrating for users. Various types of identity validation services issue validated identities that are accepted by multiple other services. These identity validation services may leverage existing known information about the user in order to verify their identity before a certificate or other identity token can be issued. The user will then have a validated identity that they can present to various applications and services without having to separately validate their identity for every application or service.

Unfortunately, traditional identity validation services may rely on documents such as a driver's license, or information such as work or credit history, that not all individuals may possess. In particular, minors are unlikely to possess sufficient documentation to satisfy most traditional identity validation services. This is unfortunate as validated identities may be extremely useful in giving minors more autonomy while simultaneously keeping them safer. Accordingly, the instant disclosure identifies and addresses a need for additional and improved systems and methods for creating validated identities for dependent users.

SUMMARY

As will be described in greater detail below, the instant disclosure describes various systems and methods for creating validated identities for dependent users by enabling a user who already has a validated identity to create a validated identity for the dependent user and linking the validated identities together.

In one example, a computer-implemented method for creating validated identities for dependent users may include (1) identifying both a validated user of an identity validation service who has a previously validated identity and a dependent user who cannot create a new validated identity via the identity validation service, (2) enabling, via a graphical user interface displayed on the computing device, the validated user to create the new validated identity for the dependent user in response to determining that the validated user has the previously validated identity, (3) linking the new validated identity for the dependent user to the previously validated identity of the validated user, and (4) generating a token that represents the new validated identity for the dependent user and that includes a link to the previously validated identity of the validated user.

In one embodiment, the computer-implemented method may further include presenting, by the dependent user, the token to a service that requires a validated identity in order to complete at least one type of transaction and completing, by the dependent user, the transaction via the service in response to the service determining that the dependent user is eligible to participate in the transaction based on the new validated identity represented by the token. In one embodiment, the service may include a vendor that distributes at least one age-restricted product and completing the transaction may include the dependent user receiving the age-restricted product in response to the service determining, based on the new validated identity, that the dependent user is an allowable age to receive the age-restricted product.

In some examples, the computer-implemented method may further include enabling the previously validated user to configure a value of at least one information field in the new validated identity for the dependent user. In one example, the computer-implemented method may further include presenting, by the dependent user, the token to a service that requires both a validated identity and a predetermined value in the information field in order to complete at least one type of transaction and determining, by the service, whether the dependent user is eligible to participate in the transaction based at least in part on whether the value of the information field configured by the previously validated user matches the predetermined value.

In one example, the dependent user may not be able to create the new validated identity because the dependent user may lack at least one proof-of-identity document required by the identity validation service to create the new validated identity. In some examples, the dependent user may include a minor and the previously validated user includes a guardian of the minor. In some embodiments, linking the new validated identity for the dependent user to the previously validated identity of the validated user may include embedding information about a relationship between the dependent user and the validated user into the new validated identity.

In one embodiment, a system, stored in memory, for implementing the above-described method may include (1) an identification module that identifies both a validated user of an identity validation service who has a previously validated identity and a dependent user who cannot create a new validated identity via the identity validation service, (2) an enabling module that enables, via a graphical user interface displayed on the computing device, the validated user to create the new validated identity for the dependent user in response to determining that the validated user has the previously validated identity, (3) a linking module that links the new validated identity for the dependent user to the previously validated identity of the validated user, (4) a generation module that generates a token that represents the new validated identity for the dependent user and that may include a link to the previously validated identity of the validated user, and (5) at least one physical processor configured to execute the identification module, the enabling module, the linking module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify both a validated user of an identity validation service who has a previously validated identity and a dependent user who cannot create a new validated identity via the identity validation service, (2) enable, via a graphical user interface displayed on the computing device, the validated user to create the new validated identity for the dependent user in response to determining that the validated user has the previously validated identity, (3) link the new validated identity for the dependent user to the previously validated identity of the validated user, and (4) generate a token that represents the new validated identity for the dependent user and that includes a link to the previously validated identity of the validated user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
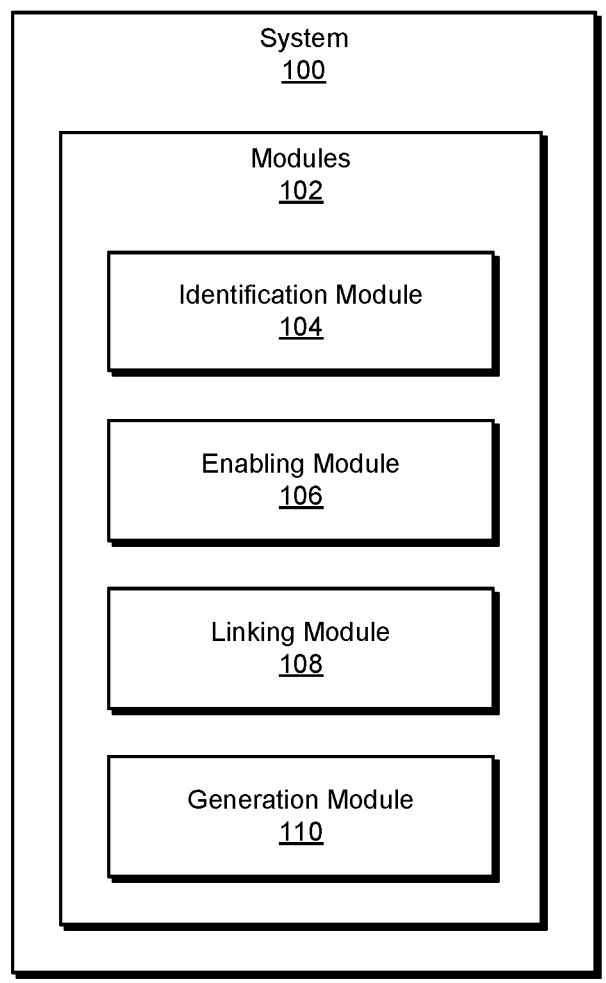
FIG. 1 is a block diagram of an exemplary system for creating validated identities for dependent users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating validated identities for dependent users. As will be explained in greater detail below, by allowing a validated user to create validated identity for a dependent user, the systems described herein may enable users without identification documents, such as children, to have validated identities that can be used to interact with a wide variety of services. Additionally, by allowing the creator of the validated identity for the dependent user to configure settings in the validated identity, guardians of minors may be able to set permissions for the minors that various types of services may rely on when determining whether to complete a transaction involving the minor.

Figure 2:
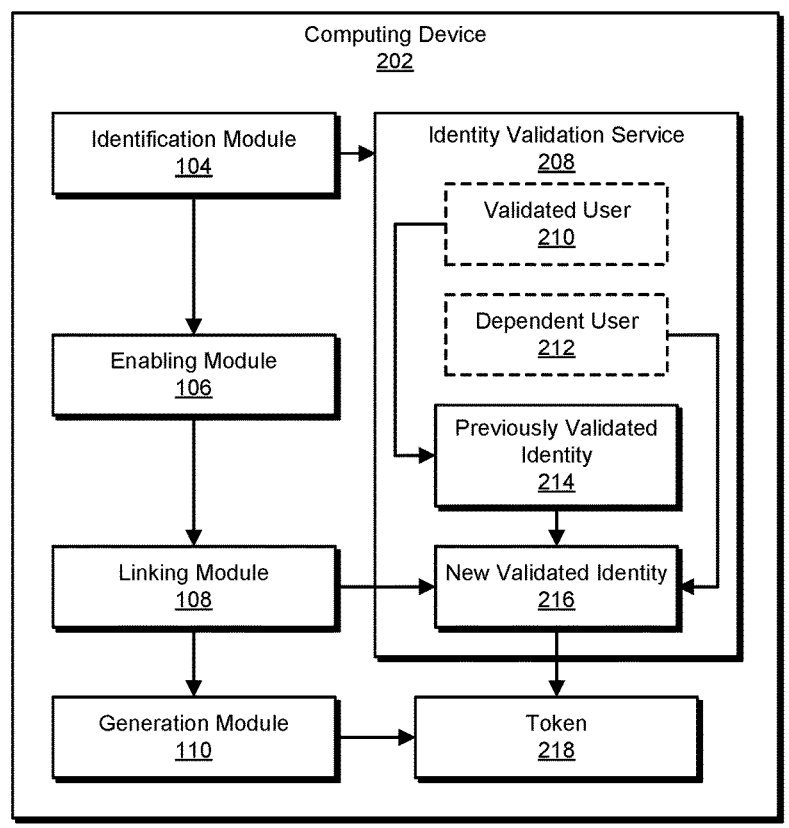
FIG. 2 is a block diagram of an additional exemplary system for creating validated identities for dependent users.
Figure 3:
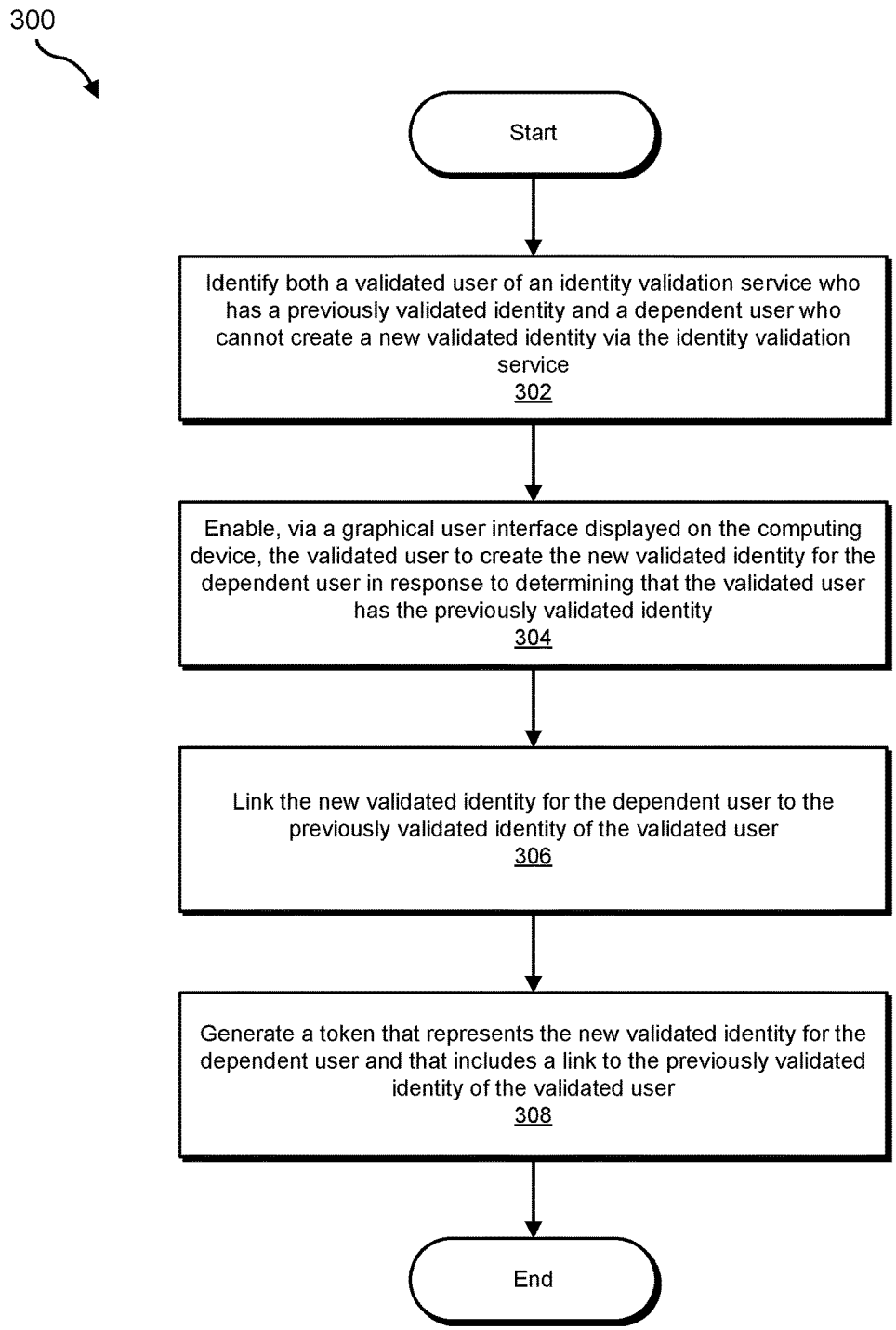
FIG. 3 is a flow diagram of an exemplary method for creating validated identities for dependent users.
Figure 4:
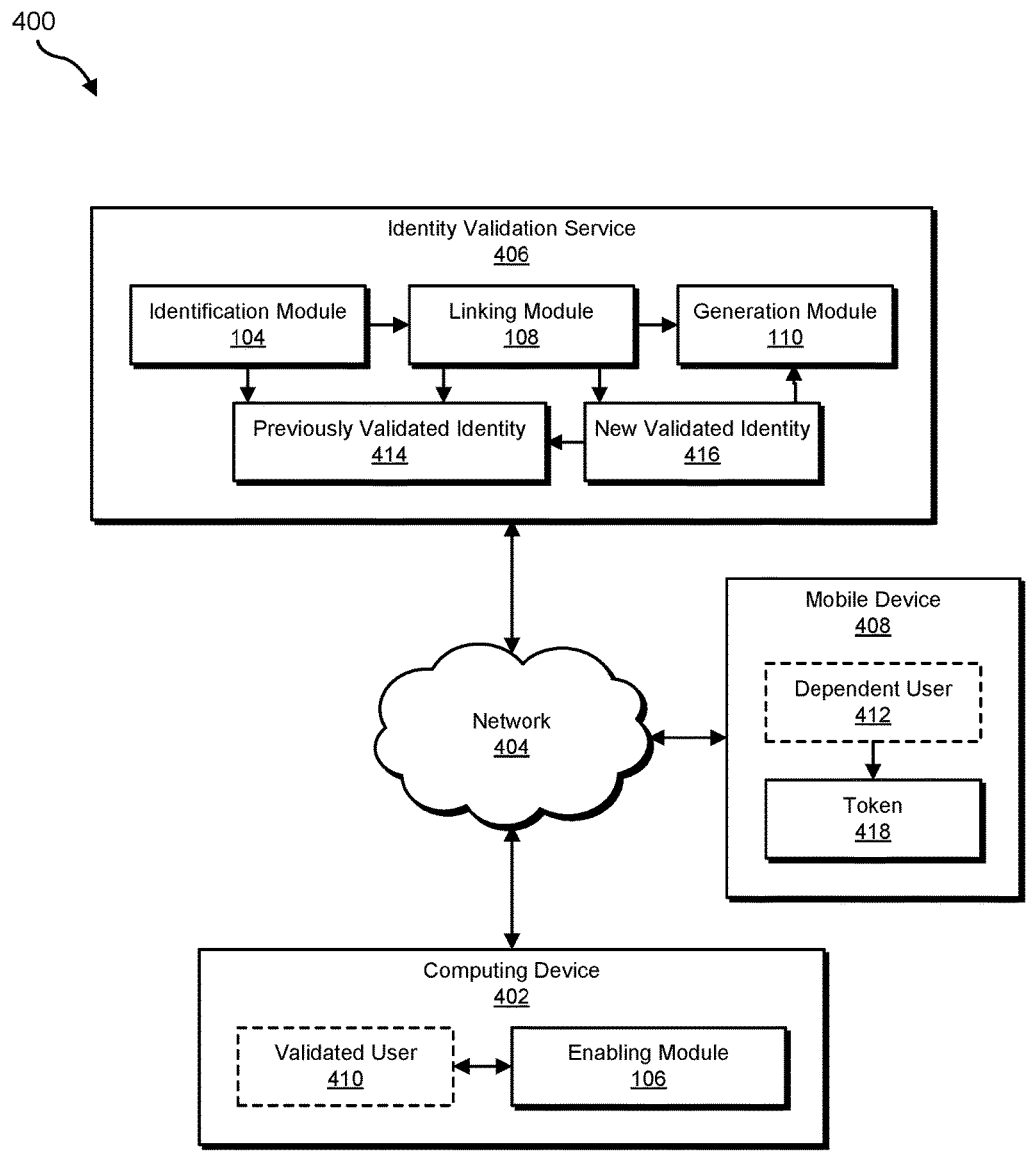
FIG. 4 is a block diagram of an exemplary computing system for creating validated identities for dependent users.

The following will provide, with reference to FIGS. 1, 2, and 4, detailed descriptions of exemplary systems for creating validated identities for dependent users. Detailed descriptions of corresponding computer-implemented methods will also be provided in connection with FIG. 3. Detailed descriptions of an exemplary decision tree for interacting with a validated identity belonging to a dependent user will also be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for creating validated identities for dependent users. As illustrated in this figure, exemplary system 100 may include one or more modules 102 for performing one or more tasks. For example, and as will be explained in greater detail below, exemplary system 100 may include an identification module 104 that identifies both a validated user of an identity validation service who has a previously validated identity and a dependent user who cannot create a new validated identity via the identity validation service. Exemplary system 100 may additionally include an enabling module 106 that enables, via a graphical user interface displayed on the computing device, the validated user to create the new validated identity for the dependent user in response to determining that the validated user has the previously validated identity. Exemplary system 100 may also include a linking module 108 that links the new validated identity for the dependent user to the previously validated identity of the validated user. Exemplary system 100 may additionally include a generation module 110 that generates a token that represents the new validated identity for the dependent user and that may include a link to the previously validated identity of the validated user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to create validated identities for dependent users. For example, and as will be described in greater detail below, identification module 104 may identify both a validated user 210 of an identity validation service 208 who has a previously validated identity 214 and a dependent user 212 who cannot create a new validated identity 216 via identity validation service 208. Enabling module 106 may enable, via a graphical user interface displayed on computing device 202, validated user 210 to create new validated identity 216 for dependent user 212 in response to determining that validated user 210 has previously validated identity 214. Next, linking module 108 may link new validated identity 216 for dependent user 212 to previously validated identity 214 of validated user 210. Finally, generation module 110 may generate a token 218 that represents new validated identity 216 for dependent user 212 and that may include a link to previously validated identity 214 of validated user 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for creating validated identities for dependent users. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify both a validated user of an identity validation service who has a previously validated identity and a dependent user who cannot create a new validated identity via the identity validation service. For example, identification module 104 may, as part of computing device 202 in FIG. 2, identify both validated user 210 of identity validation service 208 who has previously validated identity 214 and dependent user 212 who cannot create new validated identity 216 via identity validation service 208.

The term "validated identity," as used herein, generally refers to any representation of a person that has been confirmed by an identity validation service to represent that particular person. In some embodiments, a validated identity may include a variety of informational fields including, without limitation, full legal name, birth date, gender, and/or home address.

The term "identity validation service," as used herein, generally refers to any type of service that is capable of determining that a representation of a person is connected to a specific individual person. In some embodiments, an identity validation service may also be referred to as an identity verification service. Identity validation services may validate identities in numerous ways. In some examples, identity validation services may create a validated identity for an individual based on examining documents provided by the individual, such as a driver's license. Additionally or alternatively, identity validation services may create validated identities based on examining information such as employment record, credit history, and/or answers to personal knowledge questions.

The term "validated user," as used herein, generally refers to any user who possessed a validated identity as described above. The term "dependent user," as used herein, generally refers to any user who does not yet possess a validated identity for a given identity validation service and who has some connection to a validated user. In some embodiments, a dependent user may possess a validated identity for one service (e.g., a smart home network) but may be unable to create a validated identity that is accepted by a service with more stringent requirements (e.g., an online banking service).

In some examples, the dependent user may be unable to create the new validated identity because the dependent user may lack at least one proof-of-identity document required by the identity validation service to create the new validated identity. For example, the dependent user may lack a drivers' license, work history, and/or credit history due to being a minor and/or extenuating circumstances. In one example, a recent immigrant may be an adult but may lack the specific documentation required by an identity validation service.

In some examples, the dependent user may be a minor and the previously validated user may be a guardian of the minor. For example, the dependent user may be a child, and the previously validated user may be the mother, father, or legal guardian of the child. In other examples, the previously validated user may be an older sibling of the dependent user.

Identification module 104 may identify the previously validated user and the dependent users in a variety of ways. For example, identification module 104 may identify that a previously validated user has logged into an identity validation service and initiated the process to create a validated identity for a dependent user.

At step 304, one or more of the systems described herein may enable, via a graphical user interface displayed on the computing device, the validated user to create the new validated identity for the dependent user in response to determining that the validated user has the previously validated identity. For example, enabling module 106 may, as part of computing device 202 in FIG. 2, enable, via a graphical user interface displayed on computing device 202, validated user 210 to create new validated identity 216 for dependent user 212 in response to determining that validated user 210 has previously validated identity 214.

The term "graphical user interface," as used herein, generally refers to any interface displayed on a computing device that allows a user to interact with an application and/or service. In some examples, the graphical user interface may include a series of forms on a web site hosted by an identity validation service. In other examples, the graphical user interface may include a desktop application, mobile application, and/or command line interface.

Enabling module 106 may enable the validated user to create a validated identity for the dependent users in a variety of ways. For example, enabling module 106 may present the validated user with a user interface that allows the validated user to add a new user to the identity validation service, create a validated identity for another user, and/or configure a validated identity for another user. In various embodiments, enabling module 106 may be part of a mobile, desktop, and/or online application.

In one embodiment, enabling module 106 may restrict previously validated users from creating validated identities for dependent users within a predetermined age of the previously validated user. For example, the systems described herein may restrict a 17-year-old from creating a validated identity for a 15-year-old younger sibling, but may not restrict a 26-year-old from creating a validated identity for a 15-year-old younger sibling.

In some embodiments, enabling module 106 may enable the previously validated user to configure the value of at least one information field in the new validated identity for the dependent user. In some examples, the information field may relate to permissions available to the dependent user. For example, a guardian may configure a "videogame rating permissions" field on a 15-year-old child's validated identity to indicate that the child is allowed to purchase mature-rated games despite not being 17.

Additionally or alternatively, the information field may relate to other types of interactions with the dependent user. For example, a guardian may configure an "acceptable pick-ups" field on a child's validated identity to indicate to a school or activity program which adults may pick up the child from the program.

At step 306, one or more of the systems described herein may link the new validated identity for the dependent user to the previously validated identity of the validated user. For example, linking module 108 may, as part of computing device 202 in FIG. 2, link new validated identity 216 for dependent user 212 to previously validated identity 214 of validated user 210.

Linking module 108 may link the new validated identity to the previously validated identity in a variety of ways. For example, linking module 108 may include a pointer to the previously validated identity in the new validated identity. In another embodiment, linking module 108 may set a "parent" attribute of the new validated identity to an identifier of the previously validated identity. Additionally or alternatively, linking module 108 may include the previously validated identity in the new validated identity. By linking the previously validated identity to the new validated identity, linking module 108 may enable services that interact with the new validated identity to check the credentials of the user who issued the new validated identity. In embodiments where the previously validated identity is embedded into the new validated identity, services may be able to immediately check the credentials of the original validated user and/or the relationship between the validated user and the dependent user without requiring access to a central identity validation service.

In some examples, linking module 108 may link the new validated identity for the dependent user to the previously validated identity of the validated user by embedding information about a relationship between the dependent user and the validated user into the new validated identity. For example, linking module 108 may embed into the validated identity the information that the validated user is the father of the dependent user. In another example, linking module 108 may embed into the validated identity that the validated user is the sister of the dependent user.

At step 308, one or more of the systems described herein may generate a token that represents the new validated identity for the dependent user and that may include a link to the previously validated identity of the validated user. For example, generation module 110 may, as part of computing device 202 in FIG. 2, generate token 218 that represents new validated identity 216 for dependent user 212 and that may include a link to previously validated identity 214 of validated user 210.

The term "token," as used herein, generally refers to any type or form of representation of a validated identity. In some embodiments, a token may include a certificate. In some example, a token may include a public key identity certificate, a user certificate, and/or a secure socket layer certificate. In some embodiments, the token may be part of a chain of trust where a certificate that represents a validated identity is signed by a root authority such as an identity validation service and/or a certificate that represents a validated identity may be used to sign a certificate that represents a validated identity for a dependent user.

Generation module 110 may generate the token in a variety of ways. For example, generation module 110 may use a cryptographic algorithm to generate the token.

In some embodiments, the systems described herein may be hosted by an identity validation service that may communicate with one or more computing devices in order to allow users to create validated identities for dependent users. FIG. 4 is a block diagram of an exemplary computing system 400 for creating validated identities for dependent users. As illustrated in FIG. 4, a computing device 402 may communicate with an identity validation service 406 and/or a mobile device 408 via a network 404. In some embodiments, identity validation service 406 may host identification module 104, linking module 108, and/or generation module 110. In this embodiment, identity validation service 406 may also store at least one previously validated identity 414 and/or new validated identity 416. In some embodiments, identity validation service 406 may be hosted on one or more servers in one or more locations. In one embodiment, a validated user 410 may access a graphical user interface provided by enabling module 106 via a computing device 402. In some examples, validated user 410 may be an adult guardian of a minor and computing device 402 may be a laptop or desktop computer belonging to validated user 410.

In some examples, validated user 410 may copy a token 418 generated by generation module 110 onto mobile device 408. Validated user 410 may copy the token to mobile device 408 in a variety of ways including sending the token via an application, sending the token via a wired connection, and/or using near field communication. In these examples, mobile device 408 may belong to a dependent user 412 who may be a child and/or ward of validated user 410. Dependent user 412 may then use mobile device 408 to present token 418 to various organizations, services, and/or retailers that expect a representation of a validated identity.

Dependent users may use their validated identities in a variety of ways. For example, a dependent user may use their identity to connect to a shared device such as a home entertainment system, connected car, and/or a shared family service such as NETFLIX or PANDORA. In another example, a dependent user may present a token to a service that requires a validated identity in order to complete at least one type of transaction. In this example, the dependent user, may complete the transaction via the service in response to the service determining that the dependent user is eligible to participate in the transaction based on the new validated identity represented by the token.

In some examples, the service may include a vendor that distributes at least one age-restricted product. The dependent user may receive the age-restricted product in response to the service determining, based on the new validated identity, that the dependent user is an allowable age to receive the age-restricted product. For example, a 17-year-old user may attempt to buy a ticket to an R-rated movie via a kiosk, mobile application, and/or online service. In this example, the user may present a certificate stored on their mobile phone that represents their validated identity to the ticket-selling service and the ticket-selling service may sell the movie ticket to the user after examining the certificate and determining that the user is 17 and therefore eligible to buy the ticket.

In another example, the dependent user may present the token to a service that requires both a validated identity and a predetermined value in the information field in order to complete at least one type of transaction and the service may determine whether the dependent user is eligible to participate in the transaction based at least in part on whether the value of the information field configured by the previously validated user matches the predetermined value. For example, a 15-year-old user may attempt to buy an M-rated videogame from a vending machine. In this example, the user's guardian may have configured a "videogame rating permissions" field on the user's certificate to indicate that the user is allowed to purchase M-rated games. The vending machine may examine the token, determine that the user is underage but allowed to buy the game with parental permission, determine that the user has parental permission, and then allow the user to purchase the game.

Figure 5:
FIG. 5 is a flow diagram of an exemplary decision tree for interacting with a validated identity belonging to a dependent user.

Services may go through a variety of checks before completing transactions with minors. For example, as illustrated in FIG. 5, at step 502 a dependent user may attempt to purchase an age-restricted product. In some examples, the product may be age-restricted due to laws or regulations. In other examples, the product may be age-restricted independently by the vendor. For example, a vendor may choose to only sell energy drinks to minors with parental permission. The vendor may then check to see whether the dependent user has a token representing a validated identity. If the user does not have a token, the service may refuse to continue the transaction due to being unable to determine the user's age. If the user does have a token, at step 504, the vendor may determine the age of the user as stored in the validated identity. If the user is not old enough for the product, the vendor may disallow the sale. If the user is old enough to purchase the product independently, the vendor may allow the sale. For example, a 17-year-old, despite being a minor, may be old enough to independently purchase an M-rated videogame. If the user is old enough to purchase a product with parental permission, at step 506, the vendor may check the guardian permissions stored in the identity. If the user has permission from an adult, the vendor may allow the sale. If the user does not, the vendor may disallow the sale.

In some embodiments, the vendor may perform additional checks and/or may disallow dependent user identities created by certain types of users. For example, a vendor may only sell M-rated games to dependent users whose validated identity indicates that a parent or guardian created the validated identity and not to dependent users whose validated identity indicates that an older sibling created the validated identity. In another example, a vendor may only sell M-rated games to a dependent user with an identity created by another user who is at least seven years older than the dependent user. Various services may disallow the use of dependent identities created by certain types of validated users for a variety of reasons. For example, a vendor may not trust an identity created by a slightly older sibling to contain true and valid information. In other examples, a vendor may be legally obligated to only offer certain products and/or services to someone with parental permission.

In some embodiments, a validated user may be held responsible for any misrepresentation of information in a validated identity created for a dependent user by the validated user. For example, an older sibling who misrepresents their own and/or their sibling's age may be held responsible for age-inappropriate products purchased by the younger sibling. In another example, an adult who misrepresents their relationship to a minor in order to create a validated identity for that minor may be held responsible for this misrepresentation. In some embodiments, the systems described herein may revoke the validated identity of any validated user who is found to misrepresent any information involved in the creation of a validated identity for a dependent user and/or may revoke the validated identity of the dependent user that includes the misrepresented information. In one embodiment, the systems described herein may display an alert to a user who is creating a validated identity for a dependent user indicating that the user is taking responsibility for the information about the dependent user. In some embodiments, the systems described herein may revoke all validated identities for dependent users created by a validated user known to create fraudulent identities.

As described in connection with method 300 above, the systems and methods described herein may leverage a chain of trust to allow a validated user (e.g., the parent of a minor) to issue an identity to a dependent user (e.g., a child) who can't otherwise obtain a validated identity. This identity may allow third parties to validate the child's identity for a variety of purposes, such as authorizing a purchase of a product that carries age restrictions. By allowing validated users to issue identities for dependent users, the systems described herein may enable users who could not otherwise obtain validated identities to interact with systems, applications, and/or vendors that require validated identities to complete transactions. Additionally, by allowing guardians to issue identities for minors, the systems described herein may improve both safety and autonomy for minors.

Figure 6:
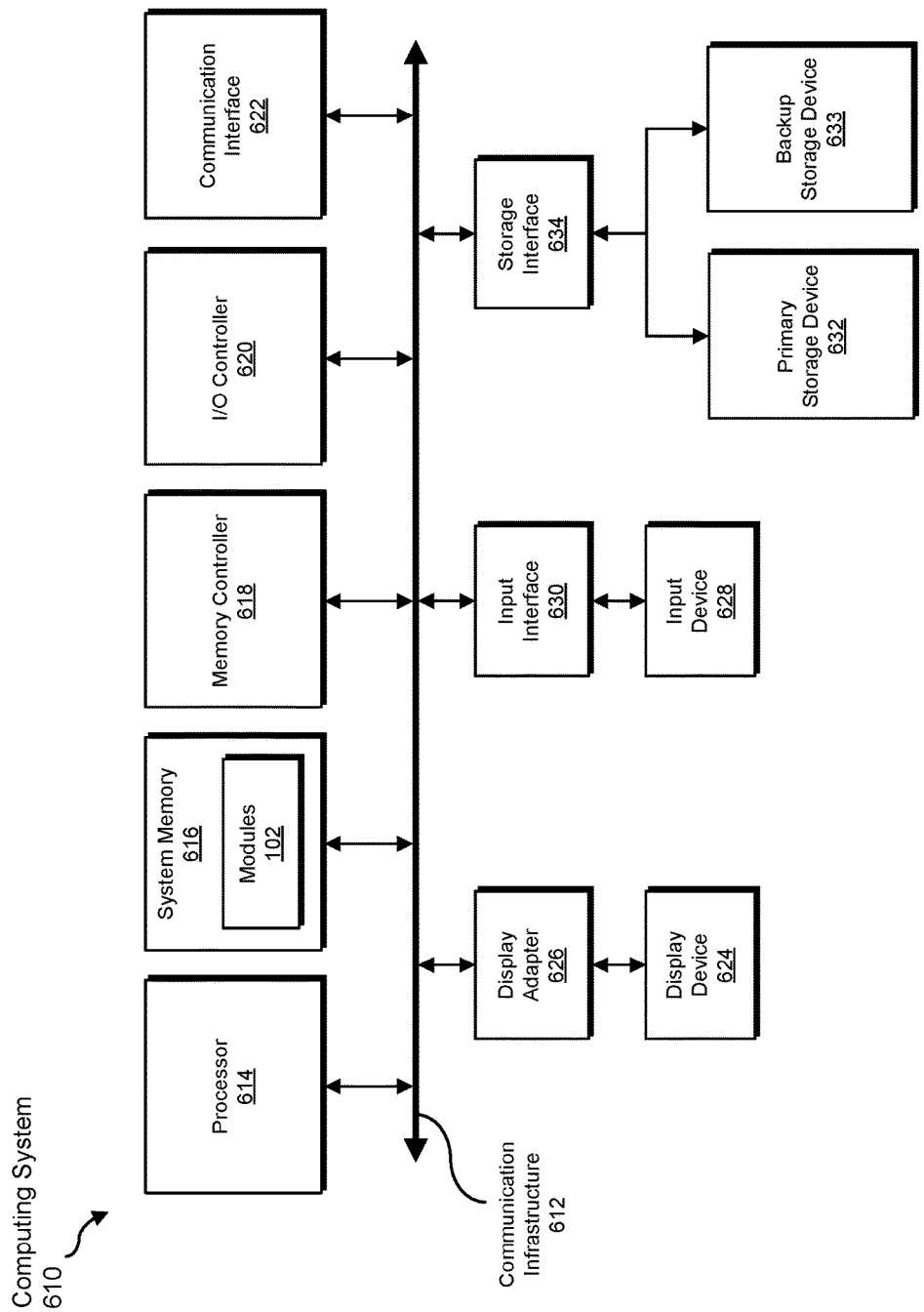
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
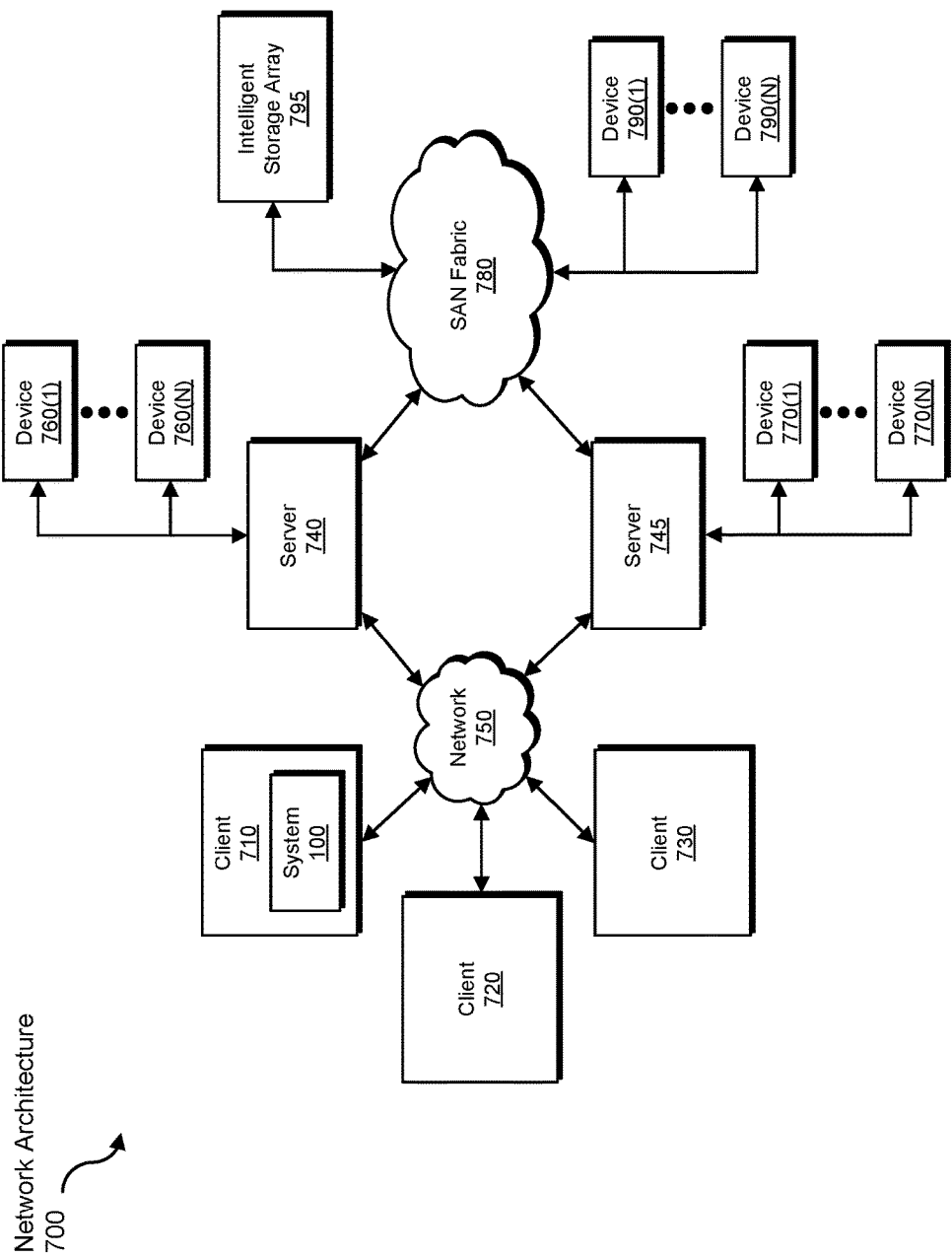
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for creating validated identities for dependent users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive identity data to be transformed, transform the identity data into a token, output a result of the transformation to a device and/or service, use the result of the transformation to check a validated identity, and store the result of the transformation to a file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating validated identities for dependent users, at least a portion of the method being performed by a computing device comprising at least one processor, the method comprising:
- identifying both a validated user of an identity validation service who has a previously validated identity and a dependent user who cannot create a new validated identity via the identity validation service;
- enabling, via a graphical user interface displayed on the computing device, the validated user to create the new validated identity for the dependent user in response to determining that the validated user has the previously validated identity;
- linking the new validated identity for the dependent user to the previously validated identity of the validated user;
- generating a token that represents the new validated identity for the dependent user and that comprises a link to the previously validated identity of the validated user;
- disallowing use of the new validated identity for the dependent user when a predetermined trust threshold value representing a difference between an age of the validated user and an age of the dependent user is not met; and
- preventing use of a fraudulent identity on the computing device by revoking the new validated identity for the dependent user and revoking the validated identity of the validated user when the validated user is known to create fraudulent identities, wherein the new validated identity comprises misrepresented information describing a relationship between the validated user and the dependent user during the creation of the new validated identity for the dependent user.

2. The computer-implemented method of claim 1, further comprising:
- presenting, by the dependent user, the token to a service that requires a validated identity in order to complete at least one type of transaction;
- completing, by the dependent user, the transaction via the service in response to the service determining that the dependent user is eligible to participate in the transaction based on the new validated identity represented by the token.

3. The computer-implemented method of claim 2, wherein:
- the service comprises a vendor that distributes at least one age-restricted product;
- completing the transaction comprises the dependent user receiving the age-restricted product in response to the service determining, based on the new validated identity, that the dependent user is an allowable age to receive the age-restricted product.

4. The computer-implemented method of claim 1, further comprising enabling the previously validated user to configure a value of at least one information field in the new validated identity for the dependent user.

5. The computer-implemented method of claim 4, further comprising:
- presenting, by the dependent user, the token to a service that requires both a validated identity and a predetermined value in the information field in order to complete at least one type of transaction;
- determining, by the service, whether the dependent user is eligible to participate in the transaction based at least in part on the predetermined value.

6. The computer-implemented method of claim 1, wherein the dependent user cannot create the new validated identity because the dependent user lacks at least one proof-of-identity document required by the identity validation service to create the new validated identity.

7. The computer-implemented method of claim 1, wherein:
- the dependent user comprises a minor;
- the previously validated user comprises a guardian of the minor.

8. The computer-implemented method of claim 1, wherein linking the new validated identity for the dependent user to the previously validated identity of the validated user comprises embedding information about a relationship between the dependent user and the validated user into the new validated identity.

9. A system for creating validated identities for dependent users, the system comprising:
- an identification module, stored in memory, that identifies both a validated user of an identity validation service who has a previously validated identity and a dependent user who cannot create a new validated identity via the identity validation service;
- an enabling module, stored in memory, that:
  - enables, via a graphical user interface displayed on a computing device, the validated user to create the new validated identity for the dependent user in response to determining that the validated user has the previously validated identity;
  - disallows use of the new validated identity for the dependent user when a predetermined trust threshold value representing a difference between an age of the validated user and an age of the dependent user is not met; and
  - prevents use of a fraudulent identity on the computing device by revoking the new validated identity for the dependent user and revoking the validated identity of the validated user when the validated user is known to create fraudulent identities, wherein the new validated identity comprises misrepresented information describing a relationship between the validated user and the dependent user during the creation of the new validated identity for the dependent user;
- a linking module, stored in memory, that links the new validated identity for the dependent user to the previously validated identity of the validated user;
- a generation module, stored in memory, that generates a token that represents the new validated identity for the dependent user and that by a link to the previously validated identity of the validated user; and
- at least one physical processor configured to execute the identification module, the enabling module, the linking module, and the generation module.

10. The system of claim 9, further comprising a transaction module, stored in memory, that:
- presents, by the dependent user, the token to a service that requires a validated identity in order to complete at least one type of transaction;
- completes, by the dependent user, the transaction via the service in response to the service determining that the dependent user is eligible to participate in the transaction based on the new validated identity represented by the token.

11. The system of claim 10, wherein:
- the service comprises a vendor that distributes at least one age-restricted product;
- the transaction module completes the transaction by the dependent user receiving the age-restricted product in response to the service determining, based on the new validated identity, that the dependent user is an allowable age to receive the age-restricted product.

12. The system of claim 9, wherein the enabling module enables the previously validated user to configure a value of at least one information field in the new validated identity for the dependent user.

13. The system of claim 12, further comprising a transaction module, stored in memory, that:
- presents, by the dependent user, the token to a service that requires both a validated identity and a predetermined value in the information field in order to complete at least one type of transaction;
- determines, by the service, whether the dependent user is eligible to participate in the transaction based at least in part on the predetermined value.

14. The system of claim 9, wherein the dependent user cannot create the new validated identity because the dependent user lacks at least one proof-of-identity document required by the identity validation service to create the new validated identity.

15. The system of claim 9, wherein:
- the dependent user comprises a minor;
- the previously validated user comprises a guardian of the minor.

16. The system of claim 9, wherein the linking module links the new validated identity for the dependent user to the previously validated identity of the validated user by embedding information about a relationship between the dependent user and the validated user into the new validated identity.

17. A non-transitory computer-readable medium comprising one or more computer-readable instructions that, when executed by at least one processor of a computing device, cause the computing device to:
- identify both a validated user of an identity validation service who has a previously validated identity and a dependent user who cannot create a new validated identity via the identity validation service;
- enable, via a graphical user interface displayed on the computing device, the validated user to create the new validated identity for the dependent user in response to determining that the validated user has the previously validated identity;
- link the new validated identity for the dependent user to the previously validated identity of the validated user;
- generate a token that represents the new validated identity for the dependent user and that comprises a link to the previously validated identity of the validated user;
- disallowing use of the new validated identity for the dependent user when a predetermined trust threshold value representing a difference between an age of the validated user and an age of the dependent user is not met; and
- prevent use of a fraudulent identity on the computing device by revoking the new validated identity for the dependent user and revoking the validated identity of the validated user when the validated user is known to create fraudulent identities, wherein the new validated identity comprises misrepresented information describing a relationship between the validated user and the dependent user during the creation of the new validated identity for the dependent user.

18. The non-transitory computer-readable medium of claim 17, wherein the one or more computer-readable instructions cause the computing device to:
- present, by the dependent user, the token to a service that requires a validated identity in order to complete at least one type of transaction;
- complete, by the dependent user, the transaction via the service in response to the service determining that the dependent user is eligible to participate in the transaction based on the new validated identity represented by the token.

19. The non-transitory computer-readable medium of claim 18, wherein:
- the service comprises a vendor that distributes at least one age-restricted product;
- the one or more computer-readable instructions cause the computing device to complete the transaction by the dependent user receiving the age-restricted product in response to the service determining, based on the new validated identity, that the dependent user is an allowable age to receive the age-restricted product.

20. The non-transitory computer-readable medium of claim 17, wherein the one or more computer-readable instructions cause the computing device to enable the previously validated user to configure a value of at least one information field in the new validated identity for the dependent user.

* * * * *